United States Patent
Stollberg et al.

(10) Patent No.: US 9,269,071 B2
(45) Date of Patent: Feb. 23, 2016

(54) COORDINATION OF COLLABORATION PARTNERS

(75) Inventors: Michael Stollberg, Dresden (DE); Rene Fleischhauer, Dresden (DE); Theo Dirk Meijler, Dresden (DE); Matthias Winkler, Dresden (DE)

(73) Assignee: SAP SE, Walldorf (DE)

( * ) Notice: Subject to any disclaimer, the term of this patent is extended or adjusted under 35 U.S.C. 154(b) by 478 days.

(21) Appl. No.: 13/439,855

(22) Filed: Apr. 5, 2012

(65) Prior Publication Data

US 2013/0268599 A1 Oct. 10, 2013

(51) Int. Cl.
  *G06Q 10/10* (2012.01)
  *G06Q 10/08* (2012.01)
  *H04L 12/18* (2006.01)

(52) U.S. Cl.
  CPC .............. *G06Q 10/10* (2013.01); *G06Q 10/08* (2013.01); *G06Q 10/103* (2013.01); *H04L 12/1813* (2013.01)

(58) Field of Classification Search
  CPC ... H04L 65/403; H04L 67/22; H04L 65/4023; H04L 12/1813; G06Q 10/10; G06Q 10/103; G06Q 10/08; G06Q 10/06
  USPC ................................................. 709/204, 205
  See application file for complete search history.

(56) References Cited

U.S. PATENT DOCUMENTS

| | | | | |
|---|---|---|---|---|
| 5,634,127 A * | 5/1997 | Cloud ...................... G06F 9/546 | | 719/313 |
| 7,222,368 B2 * | 5/2007 | Wiley et al. ...................... 726/27 |
| 7,222,369 B2 * | 5/2007 | Vering et al. ..................... 726/28 |
| 7,546,360 B2 * | 6/2009 | Chiroglazov ........ G06Q 10/025 | | 705/6 |
| 7,653,688 B2 * | 1/2010 | Bittner ................... G06Q 10/06 | | 709/204 |
| 7,743,080 B2 * | 6/2010 | Bentley ............. G06F 17/30067 | | 707/821 |
| 7,933,952 B2 * | 4/2011 | Parker ................. H04L 12/1813 | | 709/204 |
| 8,332,917 B2 * | 12/2012 | Forster .................... G06F 21/41 | | 726/3 |
| 8,645,843 B2 * | 2/2014 | Chee .................... G06F 21/6218 | | 709/206 |
| 2002/0032596 A1 * | 3/2002 | Ohsaki ................... G06Q 10/10 | | 709/223 |
| 2006/0117247 A1 * | 6/2006 | Fite ........................ G06Q 10/10 | | 715/230 |
| 2012/0180111 A1 * | 7/2012 | Velasco .............................. 726/4 |
| 2012/0272337 A1 * | 10/2012 | Velasco ............................ 726/28 |
| 2014/0032487 A1 * | 1/2014 | Rein ........................ G06F 17/30 | | 707/608 |

FOREIGN PATENT DOCUMENTS

GB 2498204 A * 10/2013 .............. H04L 26/06

OTHER PUBLICATIONS

Lu, Yahui, et al., Task-activity based access control for process collaboration, Mar. 28, 2009, Computers in Industry, pp. 403-415.*

* cited by examiner

*Primary Examiner* — Uzma Alam (57) ABSTRACT

Various embodiments of systems and methods for coordination of collaboration partners are described herein. Data from a plurality of collaboration partners is received during a collaboration process. The collaboration process involves one or more of the collaboration partners at one or more stages of the collaboration process. The data comprises process data relevant to the collaboration process. The received data is stored in one or more collaboration objects. In response to a request from a collaboration partner, a customized view of the one or more collaboration objects is generated and provided to the requesting collaboration partner based on access controls. The customized view includes information about the process data that is allowed to be viewed according to the access controls associated with the requesting collaboration partner.

18 Claims, 6 Drawing Sheets

COORDINATION OF COLLABORATION PARTNERS

BACKGROUND

Inter-organizational processes may require coordination between organizations. Inter-organizational processes exist in areas such as, but not limited to, transportation and logistics, supply chain management, and healthcare. An inter-organizational process involves different organizations at different stages of the process. Organizations perform respective activities during various stages of the process. Information about such activities should be shared for better coordination and successful completion of the process. An organization can share activity information with another organization through various communication channels. However, information exchange is mostly bilateral in that two organizations share information and the shared information may not be accessible to other organizations. This would restrict effective coordination between key stakeholders of the inter-organizational process.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for coordination of collaboration partners are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
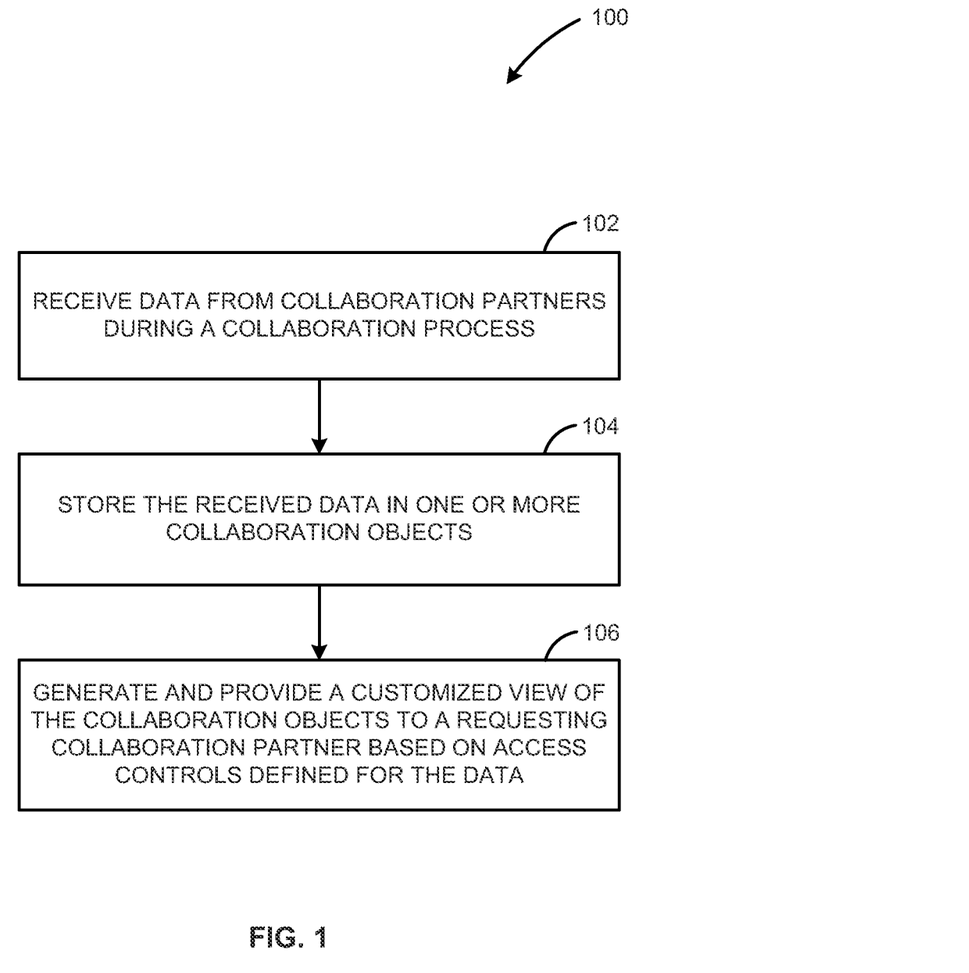
FIG. 1 is a block diagram of an embodiment of a method for coordination of collaboration partners.

FIG. 1 illustrates an embodiment of a method for coordination of collaboration partners. Organizations need to collaborate with one another for several mutual needs and benefits. These collaborating organizations are called as collaboration partners. An inter-organizational collaboration process is a process that involves a plurality of organizations. A collaboration process includes a plurality of stages and one or more organizations are involved in these stages and perform respective activities. Organizations need to collaborate to successfully and efficiently complete the process. Collaboration processes exist in areas such as, but not limited to, transport and logistics operations, supply chain management operations, healthcare related operations. A transport operation involves a customer and a transport vendor. Multiple transport vendors can be involved in transporting goods from a source to a destination. For example, transport vendors cart include a ground transport carrier and an airfreight carrier. A ground transport carrier performs activities related to ground transportation such as receiving goods from a customer, transporting the goods to a warehouse location, and finally delivering the goods to the aircraft carrier. Similarly, supply chain management (SCM) operations involve several collaborating partners performing respective activities. For example, in the context of healthcare related operations, patients may need to be transferred from one hospital to another hospital and these hospitals can form a collaborative partnership to better manage such transfer process and offer better patient care.

Figure 2:
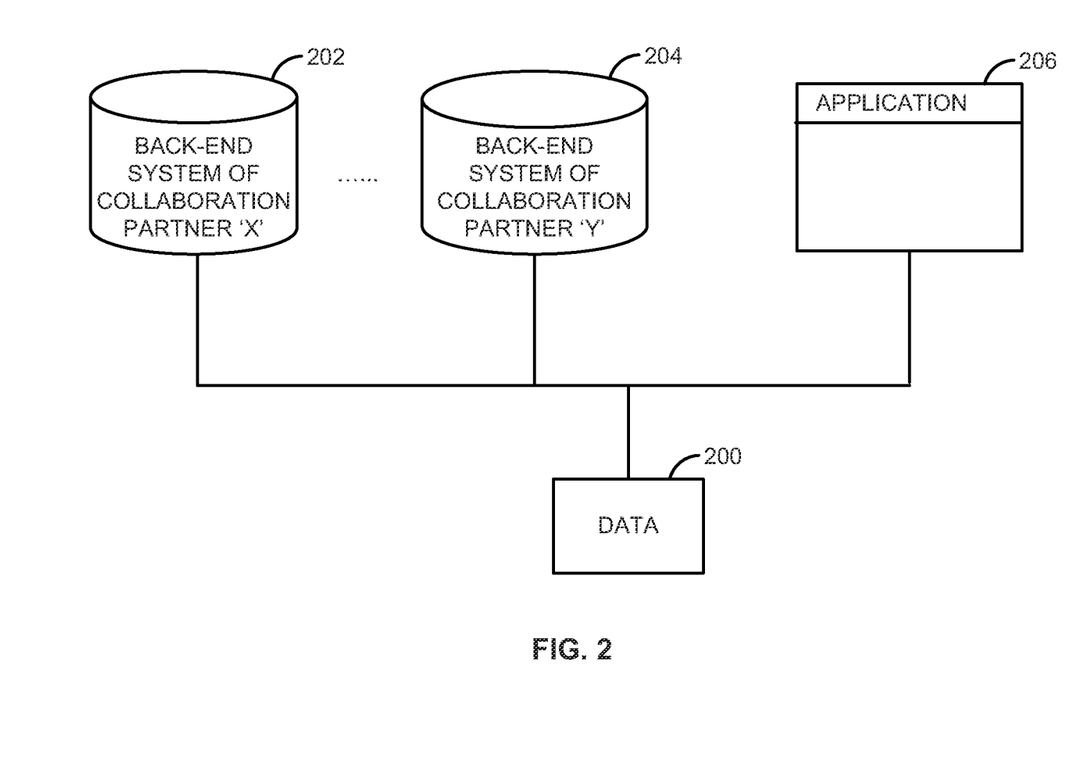
FIG. 2 is a block diagram of an embodiment of receiving data from collaboration partners.

A collaboration process is initiated by a collaboration partner and, once the process is started, the collaboration partners play their respective roles during various stages of the process. At 102, data is received from the collaboration partners during the collaboration process. Referring to FIG. 2, in one embodiment, data 200 is extracted from backend systems 202 and 204 of the collaboration partners. Collaboration partners typically use enterprise systems to store and manage data related to their operations. When a collaboration partner performs an operation during a particular stage of a collaboration process, data about that operation can be stored in a backend enterprise system. This data can be useful for other collaboration partners. For example, consider that a collaboration partner 'X' is aground transport carrier and a collaboration partner 'Y' is an airfreight carrier. The ground transport carrier can use an enterprise system to manage various operations. Data about a consignment of goods that is transported by the ground transport carrier is stored in a backend enterprise system 202 of the ground transport carrier. This data can include details such as characteristics of the consignment such as dimensions and weight. The data can also include the ground transport status such as delay, on-time, estimated time of delivery, delivered, etc.

The data stored by the ground transport carrier can be useful for other collaboration partners in the collaboration process. For example, data stored by the ground transport carrier can be useful for the airfreight carrier. The consignment characteristics stored at the ground transport carrier is useful to the airfreight carrier. Based on the consignment characteristics, the aircraft carrier can plan its operations. The airfreight carrier can store airfreight status in its backend enterprise system 204. Data stored by the ground transport carrier and airfreight carrier is also useful for the customer who placed the order for the shipment.

To enable extraction of data, collaboration partners can provide a restricted read access for the stored data. Contracts or agreements between collaboration partners can grant or define such restricted access of data. For example, if the method 100 is implemented by a collaboration partner, then other collaboration partners provide restricted read access of the stored data to the host or the implementing collaboration partner. The host collaboration partner or any other implementer of the method 100 can therefore extract relevant data from the collaboration partners. In one embodiment, identity and access management techniques can be used to define restricted access to data. For example, a user profile for a collaboration partner can be defined with a restricted read access to service interfaces such as Simple Object Access (SOAP)-based access points. The restricted read access enables access of the data relevant to the collaboration process and restricts access to other data stored in the backend systems of the collaboration partners.

In one embodiment, data 200 relevant to collaboration can be provided by the collaboration partners. Some collaboration partners may not have enterprise backend systems or may not be able to provide access to their backend enterprise systems. Such collaboration partners can access an application 206 to enter data relevant to the collaboration process. For example, a ground transport carrier can log on to the application 206 and enter consignment data and progress of the transport process. Data 200 thus provided via the application 206 is then received.

Data 200 that is received from the collaboration partners can be categorized into static data and process data. Static data is the data that is common and is unchanged throughout a particular collaboration process. For example, in the case of the logistics process, data of consignment characteristics is static and remains constant regardless of the type of the carrier. As another example, in a healthcare scenario, patient details such as name, age, and other physical characteristics can be the static data. Process data is data that is relevant to progress or status of the collaboration process. For example, in the context of logistics, process data includes details such as a location of the consignment, carrier of the consignment, transport status of the consignment such as delay or on-time statuses by various carriers, etc.

Figure 3:
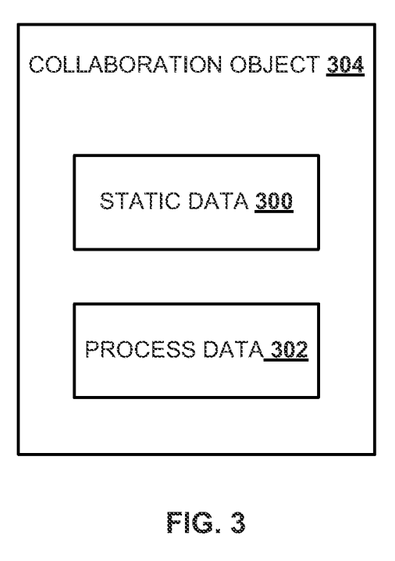
FIG. 3 is a block diagram of a collaboration object, according to one embodiment.

Referring back to FIG. 1, at 104, data that is received from the collaboration partners is stored in one or more collaboration objects. As shown in FIG. 3, the static data 300 and the process data 302 are stored in a collaboration object 304. In one embodiment, the static data 300 and the process data 302 are stored in an encapsulated manner. Encapsulation, in the context of object-oriented programming, ensures integrity of the data that is stored in the object. Encapsulation conceals the way an object is implemented and prevents unauthorized access. In one embodiment, a collaboration object stores data received from a group of collaboration partners involved in a collaboration process. For example, in the case of transport of goods, a collaboration object can store data received from all the carriers involved in the transport process.

In contrast to existing data integration systems, the method 100 enables process-driven integration. Preservation of business context via the collaboration objects allows data integration from the collaboration platform embodying the method 100 to existing backend systems (e.g., 202 and 204, referring to FIG. 2). This makes transparent use of existing systems possible. For example, an existing SCM system can be used to create a transport order. The management of the transport order is realized by the method 100 and is thus based on collaboration objects. If origin/context of the data within the collaboration object is preserved, each manipulation on the collaboration object can also update an underlying backend system. This allows transparent integration of information for backend users.

Figure 4:
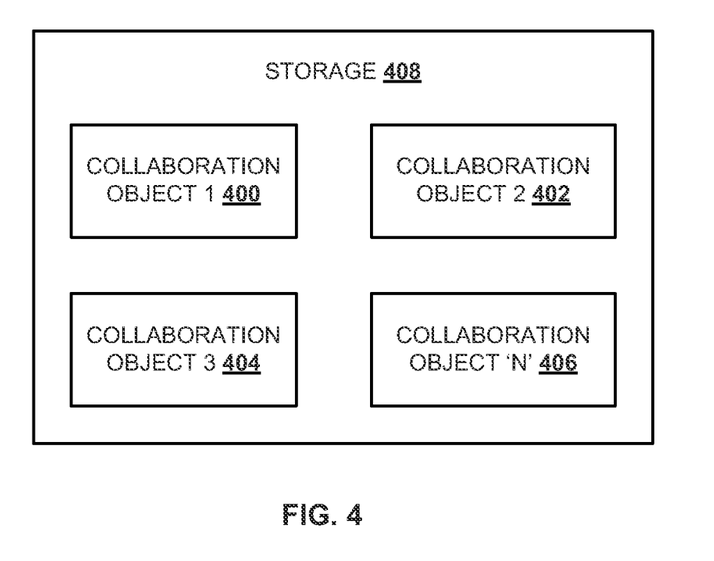
FIG. 4 is a block diagram showing collaboration objects pertaining to a collaboration process, according to one embodiment.

Referring to FIG. 4, the collaboration objects 400, 402, 404, and 406 are stored. In one embodiment, the storage 408 can be at a location of the host collaboration partner. In another embodiment, a collaboration services provider can implement the method and the storage 408 can be at the location of the service provider. In another embodiment, the collaboration objects can be stored and managed on a cloud-based system.

Referring back to FIG. 1, at 106, a customized view of the stored collaboration objects is provided to a collaboration partner involved in the collaboration process. The collaboration partner can raise a request via an application to obtain information about the collaboration process. The customized view is generated and provided in response to the request. The customized view provides a view of the stored collaboration objects that are relevant to the collaboration process. The customized view provides information based on the access controls associated with the requesting collaboration partner. These access controls can be based on the roles of the collaboration partners in the collaboration process. In one embodiment, access controls are defined for the process data stored in the collaboration objects.

Figure 5:
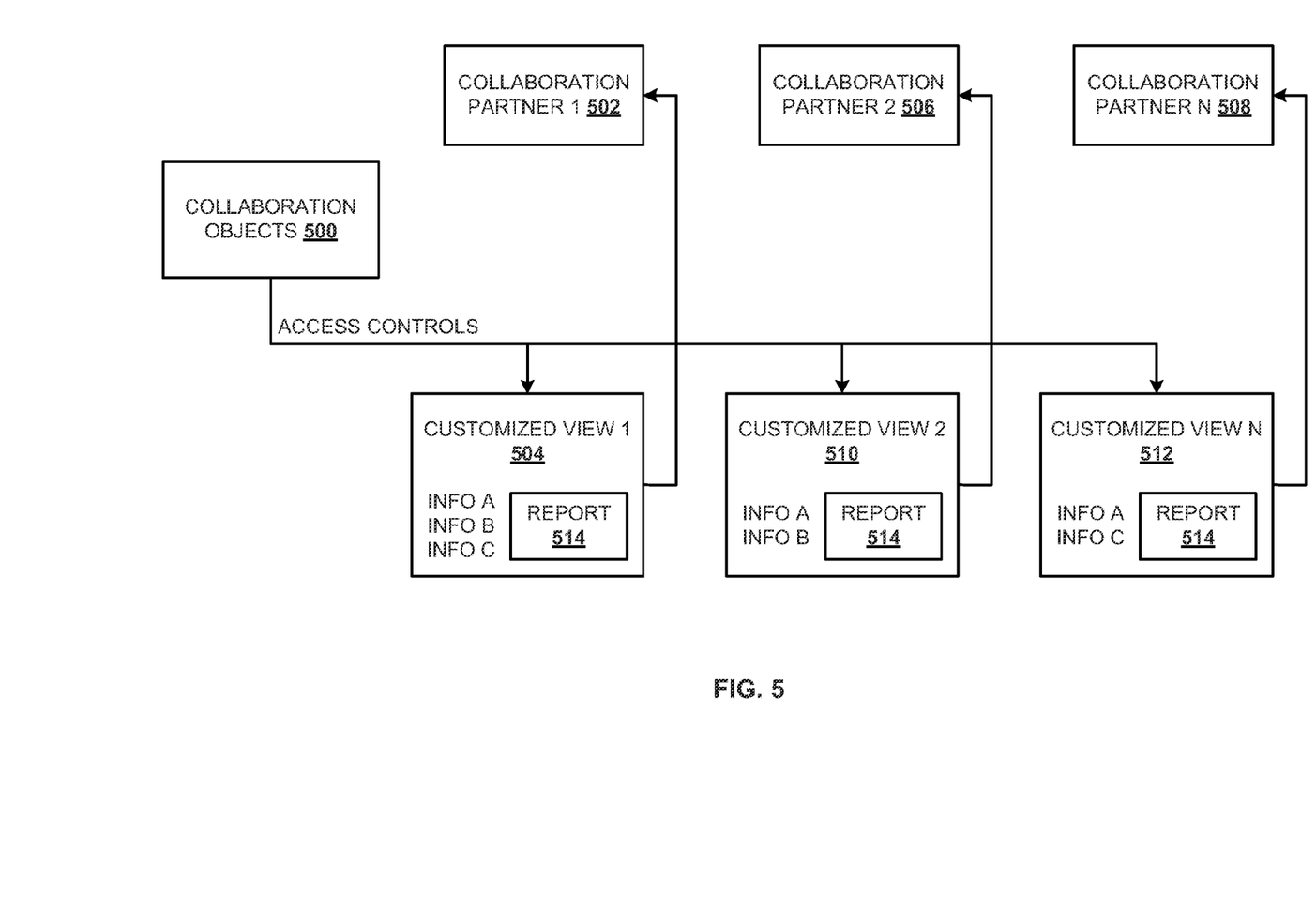
FIG. 5 is a block diagram of providing customized views to the collaboration partners, according to one embodiment.

Referring to FIG. 5, the customized views are customized such that different sets of information are provided to different collaboration partners in accordance with the access controls. The access controls can be defined in agreements between the collaboration partners. For example, terms of business agreements between collaboration partners can define what information related to collaboration process can be shared between them. Based on terms and conditions in agreements, a host collaboration partner or a collaboration services provider can define access controls on what information can be provided to a particular collaboration partner. In one embodiment, access controls can be defined by creating roles for the collaboration partners with restricted read and write access to the stored collaboration objects 500. For example, consider that a first collaboration partner 502 is allowed to have access to information 'A,' 'B,' and 'C' according to an agreement. Therefore, a role for the first collaboration partner 502 can be defined with read access to access information 'A,' 'B,' and 'C' that is stored in the collaboration objects. Therefore, information 'A,' 'B,' and 'C' can then be provided to the first collaboration partner 502 via a first customized view 504 in response to a request from the first collaboration partner 502. An authorized user from the first collaboration partner 502 can request for information via an application on a computing device such as a laptop, desktop, tablet computer, or mobile phone. In response to this request, the first customized view 504 is generated and provided to the user. The first customized view 504 is then displayed on the computing device.

Similarly, consider that a second collaboration partner 506 is allowed to have access to information 'A' and 'B' and a third collaboration partner 508 is allowed to have access to information 'A' and 'C.' A role for the second collaboration partner 506 can be defined with read access to access information 'A' and 'B' and a role for the third collaboration partner 508 can be defined with read access to access information 'A' and 'C.' Information 'A' and 'B' can be provided to the second collaboration partner 506 via a second customized view 510 and information 'A' and 'C' can be provided to the third collaboration partner 508 via a third customized view 512.

In one embodiment, the provider of the collaboration objects defines custom access rules or controls on the views.

The provider can introduce specialized rules for different types of processes. For example, in the logistics scenario it might be necessary to define different customized views for international transport and domestic transport, in a healthcare scenario, several doctors may be involved in treatment of a patient and specialized customized views on patient data may need to be defined. This approach is therefore process-specific, unlike role-based approaches.

In one embodiment, the collaboration partners can provide data relevant to collaboration process via their respective customized views. This data can be about any status or progress update about the collaboration process. The customized views can have reporting functionalities 514 to provide such updates. For example, a user from a collaboration partner can request a respective customized view and provide status updates such as delay, on-time, etc., using the reporting functionalities on the customized view. The data thus provided by the collaboration partners is also received (as in 102, FIG. 1) and stored or updated in the collaboration objects (as in 104, FIG. 1).

Figure 6:
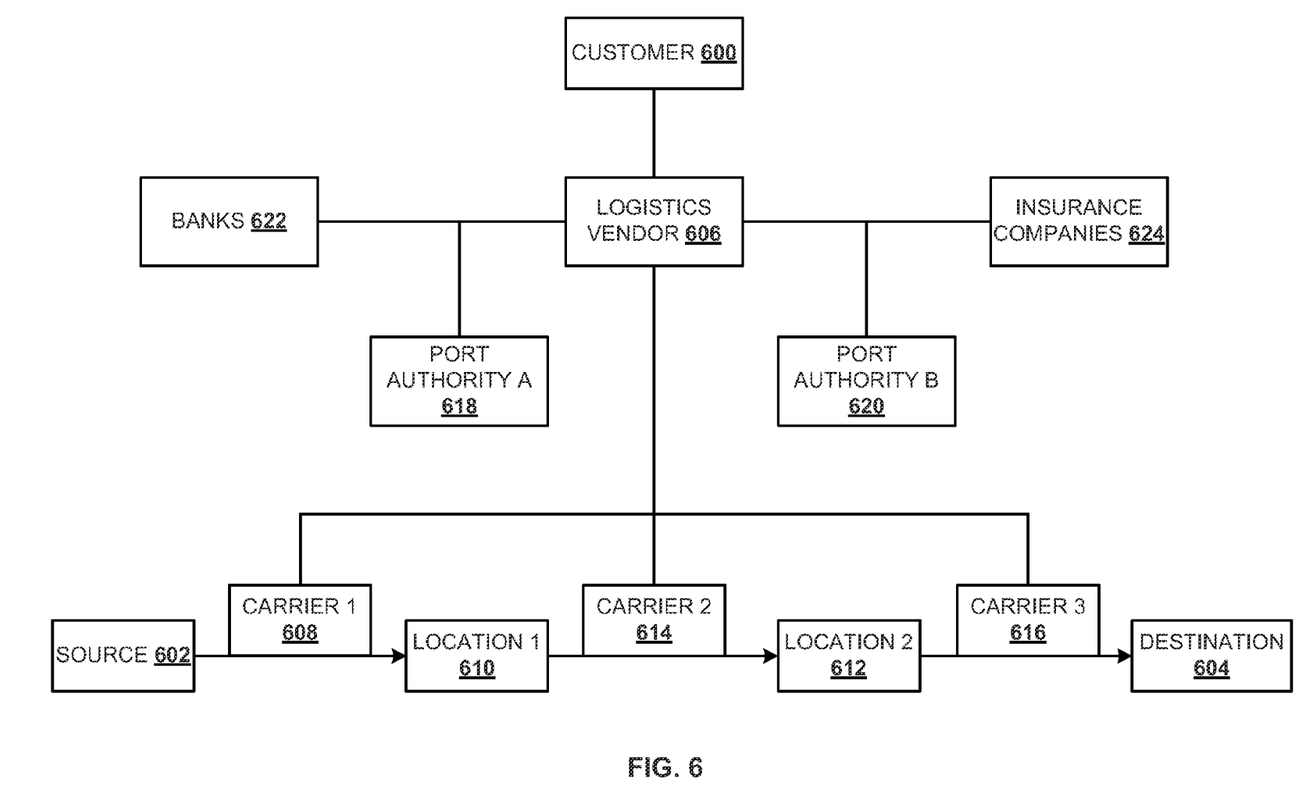
FIG. 6 is a block diagram of a freight transport operation involving several collaboration partners, according to one embodiment.

Referring to HG, 6, coordination between collaboration partners of an international freight transport is explained, as an example embodiment. A customer 600 intends to transport goods from a source 602 to a destination 604. A customer can employ a logistics vendor 606 to transport goods. The logistics vendor 606 organizes and executes the transport of goods by inviting one or more carriers. A transport process can have several transport legs. A carrier is employed in each of these transport legs. For example, as shown in the figure, the transport of goods from the source to the destination involves three transport legs. A first carrier 608 is involved from transporting goods from the source 602 to a first location 610. This first leg of transport from the source 602 to the first location 610 (e.g., a first port) can be through a freight train and the first carrier 608 can be a freight train organization.

A second leg of transport involves transporting goods from the first location 610 to a second location 612. A second carrier 614 is involved in the second leg of transport. This second leg of transport can be a ship transport and the second carrier 614 can be a shipping carrier. A third leg of transport involves transporting goods from the second location 612 (e.g., a second port) to the destination 604. A third carrier 616 is involved in the third leg of transport. This third leg of transport can be a ground transport (e.g., via truck) and the third carrier 616 can be a ground transport carrier.

The logistics vendor 606 can handle import/export formalities with the port authorities 618 and 620 of first and second ports. The logistics vendor 606 can also handle other necessary transport-related aspects such as financial aspects and insurance by dealing with banks 622 and insurance companies 624. The logistics vendor 606, carriers 608, 614, and 616, port authorities 618 and 620, banks 622, and insurance companies 624 can form a collaborative partnership through general agreements. These agreements define various terms and conditions for collaboration. Some terms and conditions can define what information is required for collaboration and can be shared between them. In one embodiment, the logistics vendor 606 can be a host collaboration partner and can host a collaboration management system embodying the method of coordination between the collaboration partners. The collaboration partners agree to use the collaboration management system. The logistics vendor 606 can therefore define access controls for the carriers.

The customer 600 requests transport of goods. The logistics vendor 606 can provide an offer to manage the transport including various formalities. Once the customer accepts the offer, the logistics vendor 606 and the customer 600 can sign an agreement. This agreement includes terms and conditions about usage of a backend system of the customer. To organize and conduct transportation, the logistics vendor 606 needs information about the goods needed to be transported. All information related to goods may not be needed. Information relevant for transport such as size, weight, pick-up location, and destination, etc., is required by the logistics vendor 606. Therefore, in accordance with the agreement, this relevant information can be automatically extracted from the back-end system of the customer 600 into the collaboration management system. To enable automatic extraction, the customer 600 can provide a restricted read-access to the backend system to the logistics vendor 606. In another embodiment, the customer 600 can access an application to provide the information to the logistics vendor 606. This information about goods received by the logistics vendor 606 from the customer 600 is stored in a collaboration object. The collaboration object stores this information about goods as static data.

The logistics vendor 606 can then define the overall transport plan. The logistics vendor 606 can define transport legs, select the carriers that are part of collaborative network, and arrange for any necessary documentation such as import/export declarations, customs declarations, insurances, etc. In one embodiment the logistics vendor 606 can inspect the capacities and offers provided by the carriers 608, 614, and 616. Since the carriers and the logistics vendor 606 are collaboration partners, the logistics vendor 606 can extract data from back-end systems of the carriers 608, 614, and 616. This data can include details about availability, capacity, and pricing. Similarly, the logistics vendor 606 can extract regulations, costs, and declarations related data from back-end systems of port authorities 618 and 620, banks 622, and insurance companies 624.

Following which, transport legs and carriers are selected and any necessary transport documents can be prepared by the logistics vendor 606. A logistics plan is then defined. The logistics plan includes details about transport process such as transport legs of the transport process and carriers involved in the transport legs. The logistics plan is stored in one or more collaboration objects in the collaboration management system. In one embodiment, the collaboration objects can be encrypted for storage in the collaboration management system.

A collaboration partner involved in the transport process is provided with a view of the collaboration objects that is customized for that collaboration partner. Each collaboration partner requires a different view of the collaboration process and, in view of agreements, allowed to see certain information of the collaboration process that is stored in the collaboration objects. In one embodiment, access controls for collaboration partners are defined for the process data stored in the collaboration objects. Access controls for a collaboration partner determine what process data, e.g., transport status, can be viewed by that collaboration partner. Access controls can be defined by the logistics vendor 606 by creating roles for the carriers 608, 614, and 616 and port authorities 618 and 620 with restricted read and write access to the stored collaboration objects. For example, the carriers 608, 614, and 616 are mainly interested in the transport legs they are involved in. Also, to better organize their internal fleet and load management, a carrier may need to know transport status of a previous transport leg. Therefore, access controls can be defined accordingly and the customized view for a carrier can include transport status of that carrier and transport status of a previous transport leg, if any. For example, the second carrier 614 may need to know whether goods will be delivered on time by the first carrier 612. For this reason, the customized view for the second carrier 614 includes status of the first transport leg.

The port authorities 618 and 620 are interested in the incoming and outgoing freight along with necessary customs declarations. Therefore, the customized view for a port authority can include details such as arrival time of freight. Logistics vendor 606 can have the right to see the overall logistics plan and transport status information for all the transport legs, and other details such as pricing details of the carriers. Therefore, the customized view for the logistics vendor 606 includes overall logistics plan and transport statuses of various carriers and pricing details. The customized views for all the collaboration partners can include static data such as characteristics of goods.

The transport is initiated and conducted as defined in the logistics plan, which is stored in the collaboration management system. During the transport process, the collaboration objects are updated. Static data such as characteristics of goods such as size, weight, and dimensions store in the collaboration objects remain constant. Process data such as the status of the transport can be updated based on the information provided by the carriers. For example, when the goods are picked up by the first carrier 608, the transport status can be updated to "In freight train" or other similar status update to indicate that the goods are in first transport leg. In one embodiment, such updates can be provided by the first carrier 608 to the logistics vendor 606 via the customized view. For example, the first carrier 608 can provide an update that the shipment is on time using reporting functionalities in the customized view. In another embodiment, transport status updates can be extracted from backend systems of the carriers.

The transport process is flexible and can be changed depending on the situation. For example, if the second leg of transport is delayed due to bad weather, the second carrier can report such delay to the collaboration management system. The logistics vendor 606 can have this update via the customized view. The logistics vendor 606 can then adapt the logistics plan accordingly. This adapted logistics plan is reflected in the collaboration objects. Other collaboration partners such as the third carrier and port authorities can view this delay update or updated logistics plan to adjust their operations.

It should be noted that the above described coordination method between collaboration partners can be employed in various other scenarios in addition to transport scenario described above. Proper coordination between collaboration partners is essential for smooth flow and successful completion of a collaboration process. The coordination method enables information exchange between the collaboration partners during the collaboration process. Therefore, collaboration partners can keep track of the progress of the collaboration process and adjust their operations accordingly. Also, customized views on the collaboration objects restrict the information that can be viewed by the collaboration partners. This prevents any unauthorized or unnecessary access of collaboration data. The central management of the collaboration objects by a host collaboration paltrier or any other implementer of the method ensures consistency of the information.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
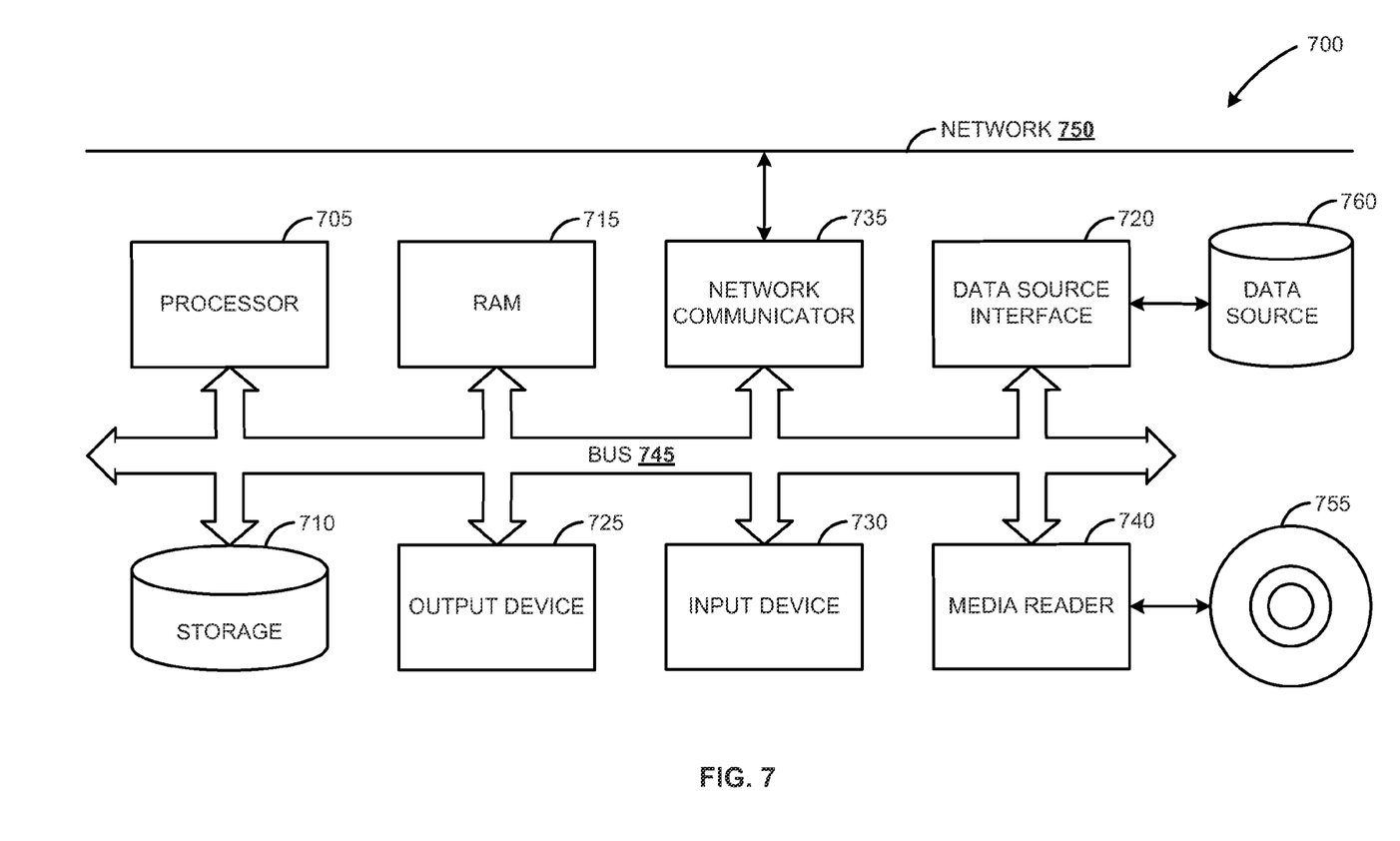
FIG. 7 is a block diagram of an exemplary computer system according to one embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   receive data from a plurality of collaboration partners during an inter-organizational collaboration process involving one or more of the collaboration partners at one or more stages of the collaboration process, wherein the data is relevant to the collaboration process and operations performed by the plurality of collaboration partners;
   categorize the received data to static data and process data, wherein the static data remains constant and unchanged throughout the collaboration process, and wherein the process data comprises details associated with progress of the collaboration process;
   store the categorized data in one or more collaboration objects;
   receive access controls defining restricted access to the stored categorized data for one or more collaboration partners of the plurality of collaboration partners, wherein the restricted access is based on one or more agreements between the plurality of collaboration partners; and
   in response to a request from a collaboration partner of the plurality of collaboration partners, generate and provide a customized view of the one or more collaboration objects for the requesting collaboration partner based on the access controls, wherein the customized view includes a first part of the static data and a second part of the process data, and wherein the first part of the static data and the second part of the process data are allowed to be provided to the requesting collaboration partner according to one or more of the access controls.

2. The article of manufacture of claim 1, wherein an activity is performed by at least one of the plurality of collaboration partners during the one or more stages of the collaboration process.

3. The article of manufacture of claim 1, wherein a host collaboration partner from the plurality of collaboration partners defines the access controls for the categorized data.

4. The article of manufacture of claim 1, wherein the instructions to receive the data from the plurality of the collaboration partners, further comprises instructions to:
   extract the data from backend systems of the plurality of the collaboration partners.

5. The article of manufacture of claim 1, wherein the instructions to receive the data from the plurality of the collaboration partners, further comprises instructions to:
   receive the data that is provided by users of the plurality of the collaboration partners via one or more user interfaces.

6. The article of manufacture of claim 1, wherein the process data and the static data are stored in the one or more collaboration objects in an encapsulated manner.

7. A computer-implemented method for collaboration, the method comprising:
   receiving data from a plurality of collaboration partners during an inter-organizational collaboration process involving one or more of the collaboration partners at one or more stages of the collaboration process, wherein the data is relevant to the collaboration process and operations performed by the plurality of collaboration partners;
   categorizing the received data to static data and process data, wherein the static data remains constant and unchanged throughout the collaboration process, and wherein the process data comprises details associated with progress of the collaboration process;

storing the categorized data in one or more collaboration objects;

receiving access controls defining restricted access to the stored categorized data for one or more collaboration partners of the plurality of collaboration partners, wherein the restricted access is based on one or more agreements between the plurality of collaboration partners; and in response to a request from a collaboration partner of the plurality of collaboration partners, generating and providing a customized view of the one or more collaboration objects for the requesting collaboration partner based on access controls, wherein the customized view includes a first part of the static data and a second part of the process data, and wherein the first part of the static data and the second part of the process data are allowed to be provided to the requesting collaboration partner according to one or more of the access controls.

8. The method of claim 7, wherein the process data and the static data are stored in the one or more collaboration objects in an encapsulated manner.

9. The method of claim 8, wherein a host collaboration partner from the plurality of collaboration partners defines the access controls for the categorized data.

10. The method of claim 7, wherein an activity is performed by at least one of the plurality of the collaboration partners during the one or more stages of the collaboration process.

11. The method of claim 7, receiving data from the plurality of collaboration partners further comprising:
extracting the data from backend systems of the plurality of the collaboration partners.

12. The method of claim 7, receiving data from the plurality of collaboration partners further comprising:
receiving the data that is provided by users of the plurality of the collaboration partners via one or more user interfaces.

13. A computer system for collaboration, comprising:
a computer memory to store program code; and
a processor to execute the program code to:
receive data from a plurality of collaboration partners during an inter-organizational collaboration process involving one or more of the collaboration partners at one or more stages of the collaboration process, wherein the data is relevant to the collaboration process and operations performed by the plurality of collaboration partners;

categorize the received data to static data and process data, wherein the static data remains constant and unchanged throughout the collaboration process, and wherein the process data comprises details associated with progress of the collaboration process;

store the categorized data in one or more collaboration objects;

receive access controls defining restricted access to the stored categorized data for one or more collaboration partners of the plurality of collaboration partners, wherein the restricted access is based on one or more agreements between the plurality of collaboration partners; and in response to a request from a collaboration partner of the plurality of collaboration partners, generate and provide a customized view of the one or more collaboration objects for the requesting collaboration partner based on the access controls, wherein the customized view includes a first part of the static data and a second part of the process data, and wherein the first part of the static data and the second part of the process data are allowed to be provided to the requesting collaboration partner according to one or more of the access controls.

14. The system of claim 13, wherein the process data and the static data are stored in the one or more collaboration objects in an encapsulated manner.

15. The system of claim 14, wherein a host collaboration partner from the plurality of collaboration partners defines the access controls for the categorized data.

16. The system of claim 14, wherein an activity is performed by at least one of the plurality of the collaboration partners during the one or more stages of the collaboration process.

17. The system of claim 14, wherein the program code to receive data from the plurality of collaboration partners, further comprises program code to:
extract the data from backend systems of the plurality of the collaboration partners.

18. The system of claim 14, wherein the program code to receive data from the plurality of collaboration partners, further comprises program code to: receive the data that is provided by users of the plurality of the collaboration partners via one or more user interfaces.

* * * * *